(12) United States Patent
Muthukrishnan et al.

(10) Patent No.: US 11,915,506 B2
(45) Date of Patent: Feb. 27, 2024

(54) METHOD AND SYSTEM FOR SUSTAINABILITY MEASUREMENT

(71) Applicant: Tata Consultancy Services Limited, Mumbai (IN)

(72) Inventors: Indira Priyadarsini Muthukrishnan, Kochi (IN); Subramanian Kuppuswami, Bangalore (IN); Chandan Singh, Pune (IN); Uma Mundoli Narayanan, Kochi (IN); Rajkumar Pallikuth, Kochi (IN); Rahul Kanna Rajarathinam, Bangalore (IN); Parvatharaj Sundaresan Balasubramanian, Kochi (IN); Ishan Verma, Gurgaon (IN); Tushar Goel, Gurgaon (IN); Lipika Dey, Gurgaon (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 422 days.

(21) Appl. No.: 17/467,953

(22) Filed: Sep. 7, 2021

(65) Prior Publication Data

US 2022/0076011 A1    Mar. 10, 2022

(51) Int. Cl.
*G06V 30/416*    (2022.01)
*G06F 40/30*    (2020.01)
(Continued)

(52) U.S. Cl.
CPC ............ *G06V 30/416* (2022.01); *G06F 17/16* (2013.01); *G06F 18/22* (2023.01); *G06F 40/30* (2020.01); *G06V 30/422* (2022.01)

(58) Field of Classification Search
CPC .... G06V 30/416; G06V 30/422; G06F 17/16; G06F 18/22; G06F 40/30; G06F 40/279; G06Q 10/0639
(Continued)

(56) References Cited

U.S. PATENT DOCUMENTS 8,645,174 B2    2/2014  Clark et al.
9,336,192 B1 *  5/2016  Barba ................... G06F 40/284
(Continued)

FOREIGN PATENT DOCUMENTS

CA      3050005 A1     7/2018
CN      101218596 A    7/2008
CN      104995644 A    10/2015

OTHER PUBLICATIONS

Yousif et al. (Enhance Medical Sentiment Vectors through Document Embedding using Recurrent Neural Network, Jan. 2020, pp. 1-8). (Year: 2020).*

(Continued)

*Primary Examiner* — Shahid K Khan
*Assistant Examiner* — Ahamed I Nazar
(74) *Attorney, Agent, or Firm* — FINNEGAN, HENDERSON, FARABOW, GARRETT & DUNNER LLP

(57) ABSTRACT

Sustainability measurement is critical to determine whether industry performance is heading in intended direction. State of the art systems in the field of sustainability measurement fail to consider many parameters which are indicative of the sustainability of industries. The disclosure herein generally relates to industry monitoring, and, more particularly, to a method and system for sustainability measurement in an industrial environment. The system calculates similarity score which indicates similarity between different sentences and indicators, and used the calculated similarity scores and (Continued)

extracted features to classify the sentences as belonging to specific classes. This information is in turn used for measuring sustainability of organization from which input data have been collected.

9 Claims, 4 Drawing Sheets

(51) Int. Cl.
*G06V 30/422* (2022.01)
*G06F 17/16* (2006.01)
*G06F 18/22* (2023.01)

(58) Field of Classification Search
USPC .......................................................... 715/200
See application file for complete search history.

(56) References Cited

U.S. PATENT DOCUMENTS

| | | | |
|---|---|---|---|
| 10,289,107 B2 | 5/2019 | Warner et al. | |
| 10,666,792 B1* | 5/2020 | Marzuoli | H04M 3/436 |
| 2007/0156478 A1 | 7/2007 | Breene et al. | |
| 2017/0124656 A1 | 5/2017 | Sandor et al. | |
| 2017/0228414 A1* | 8/2017 | Shazeer | G06F 40/44 |
| 2018/0189691 A1* | 7/2018 | Oehrle | G06N 7/01 |
| 2019/0034407 A1* | 1/2019 | Hagiwara | G06F 18/295 |
| 2019/0370394 A1* | 12/2019 | Li | G06N 3/082 |
| 2020/0356729 A1* | 11/2020 | Duan | G06N 3/08 |
| 2021/0303609 A1* | 9/2021 | Atasu | G06V 10/761 |
| 2022/0067282 A1* | 3/2022 | Suhara | G06F 40/30 |
| 2022/0188520 A1* | 6/2022 | Iso-Sipila | G06F 40/295 |
| 2022/0245109 A1* | 8/2022 | Hatami-Hanza | G06N 7/01 |
| 2022/0343076 A1* | 10/2022 | Saito | G06N 3/02 |
| 2023/0130902 A1* | 4/2023 | Saito | G06F 40/30 |
| | | | 704/9 |

OTHER PUBLICATIONS

Pham et al. (Exploiting multiple word embeddings and one-hot character vectors for aspect-based sentiment analysis, published 2018, pp. 1-10) (Year: 2018).*

Yan et al., "Leveraging Contextual Sentences for Text Classification by Using a Neural Attention Model," Computational Intelligence and Neuroscience, 2019:8320316, 11 pages, (2019).

Zhang et al., "Calculating Statistical Similarity between Sentences," Journal of Convergence Information Technology, 6:2 (2011).

* cited by examiner

METHOD AND SYSTEM FOR SUSTAINABILITY MEASUREMENT

PRIORITY CLAIM

This U.S. patent application claims priority under 35 U.S.C. § 119 to: India Application No. 202021038985, filed on Sep. 9, 2020. The entire contents of the aforementioned application are incorporated herein by reference.

TECHNICAL FIELD

The disclosure herein generally relates to industry monitoring, and, more particularly, to a method and system for sustainability measurement in an industrial environment.

BACKGROUND

There are various factors which affect sustainability of any industry. For example, in a banking/investment industry, a challenge is to track the sustainability impact created by entities such as companies, and institutions in a more standardized/uniform manner comparable with peers, and which can be aggregated at higher levels. The sustainability impact is reported in highly individualistic, textual reports inhibiting one-to-one comparability, quantification and aggregation. This is more complex as the reporting is often suggestive, pursued as an image building, and nice to have rather than being obligatory. This makes the data disparate, non-uniform and non-standardized. While more social accountability is enforced on entities of all kinds with respect to sustainability, the reporting is yet to mature and to be standardized despite various standards and formats existing. Hence, any institution pursuing assessment of sustainability of its clients is fraught with challenges of data availability, standardization of metrics and apple to orange comparison difficulties.

SUMMARY

Embodiments of the present disclosure present technological improvements as solutions to one or more of the above-mentioned technical problems recognized by the inventors in conventional systems. For example, in one embodiment, a processor implemented method for sustainability measurement is provided. Initially, a plurality of documents in one or more formats are collected from at least one data source as input, via one or more hardware processors, wherein the plurality of documents contain organizational data. Further, the organizational data is extracted using at least one data-crawling mechanism, via the one or more hardware processors. The extracted organizational data are then processed via the one or more hardware processors. During processing of the organizational data, a first matrix is generated, wherein each row of a plurality of rows in the first matrix is a vector representation of each of a plurality of words in at least one sentence in the extracted organizational data. The vector representation of each of the plurality of rows is replaced with a corresponding zero vector. Further, a second matrix is generated, wherein a plurality of rows of the second matrix correspond to embeddings of a plurality of words in at least one indicator, and at least one other row in the second matrix correspond to a tuple-wise average of the embeddings. Further, a similarity matrix is generated, wherein each entry in the similarity matrix is computed as a function of cosine similarity between a sentence word and an indicator word. Then a similarity score is calculated based on data in the similarity matrix, wherein the similarity score calculated for each sentence and an indicator represents extent of match of the sentence with the indicator. Further, a plurality of features are extracted from each of a plurality of sentences of the organizational data, and then at least one indicator matching each of the plurality of sentences is identified based on the calculated similarity score and the extracted plurality of features.

In another aspect, a system for sustainability measurement is provided. The system includes one or more hardware processors, a communication interface, and a memory storing a plurality of instructions. The plurality of instructions when executed, cause the one or more hardware processors to collect a plurality of documents in one or more formats from at least one data source as input, wherein the plurality of documents contain organizational data. Further, the system extracts the organizational data using at least one data-crawling mechanism, via the one or more hardware processors. The extracted organizational data are then processed via the one or more hardware processors. During processing of the organizational data, a first matrix is generated, wherein each row of a plurality of rows in the first matrix is a vector representation of each of a plurality of words in at least one sentence in the extracted organizational data. The vector representation of each of the plurality of rows is replaced with a corresponding zero vector. Further, a second matrix is generated, wherein a plurality of rows of the second matrix correspond to embeddings of a plurality of words in at least one indicator, and at least one other row in the second matrix correspond to a tuple-wise average of the embeddings. Further, a similarity matrix is generated, wherein each entry in the similarity matrix is computed as a function of cosine similarity between a sentence word and an indicator word. Then a similarity score is calculated based on data in the similarity matrix, wherein the similarity score calculated for each sentence and an indicator represents extent of match of the sentence with the indicator. Further, a plurality of features are extracted from each of a plurality of sentences of the organizational data, and then at least one indicator matching each of the plurality of sentences is identified based on the calculated similarity score and the extracted plurality of features.

In yet another aspect, a non-transitory computer readable medium for sustainability measurement is provided The non-transitory computer readable medium includes a plurality of instructions stored in a memory of a system that performs the sustainability measurement. The plurality of instructions, when executed, cause one or more hardware processors to perform the sustainability measurement by executing the following sequence of steps. Initially, a plurality of documents in one or more formats are collected from at least one data source as input, via one or more hardware processors, wherein the plurality of documents contain organizational data. Further, the organizational data is extracted using at least one data-crawling mechanism, via the one or more hardware processors. The extracted organizational data are then processed via the one or more hardware processors. During processing of the organizational data, a first matrix is generated, wherein each row of a plurality of rows in the first matrix is a vector representation of each of a plurality of words in at least one sentence in the extracted organizational data. The vector representation of each of the plurality of rows is replaced with a corresponding zero vector. Further, a second matrix is generated, wherein a plurality of rows of the second matrix correspond to embeddings of a plurality of words in at least one indicator, and at least one other row in the second matrix correspond to a tuple-wise average of the embeddings. Further, a similarity matrix is generated, wherein each entry in the similarity matrix is computed as a function of cosine similarity between a sentence word and an indicator word. Then a similarity score is calculated based on data in the similarity matrix, wherein the similarity score calculated for each sentence and an indicator represents extent of match of the sentence with the indicator. Further, a plurality of features are extracted from each of a plurality of sentences of the organizational data, and then at least one indicator matching each of the plurality of sentences is identified based on the calculated similarity score and the extracted plurality of features.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Figure 1:
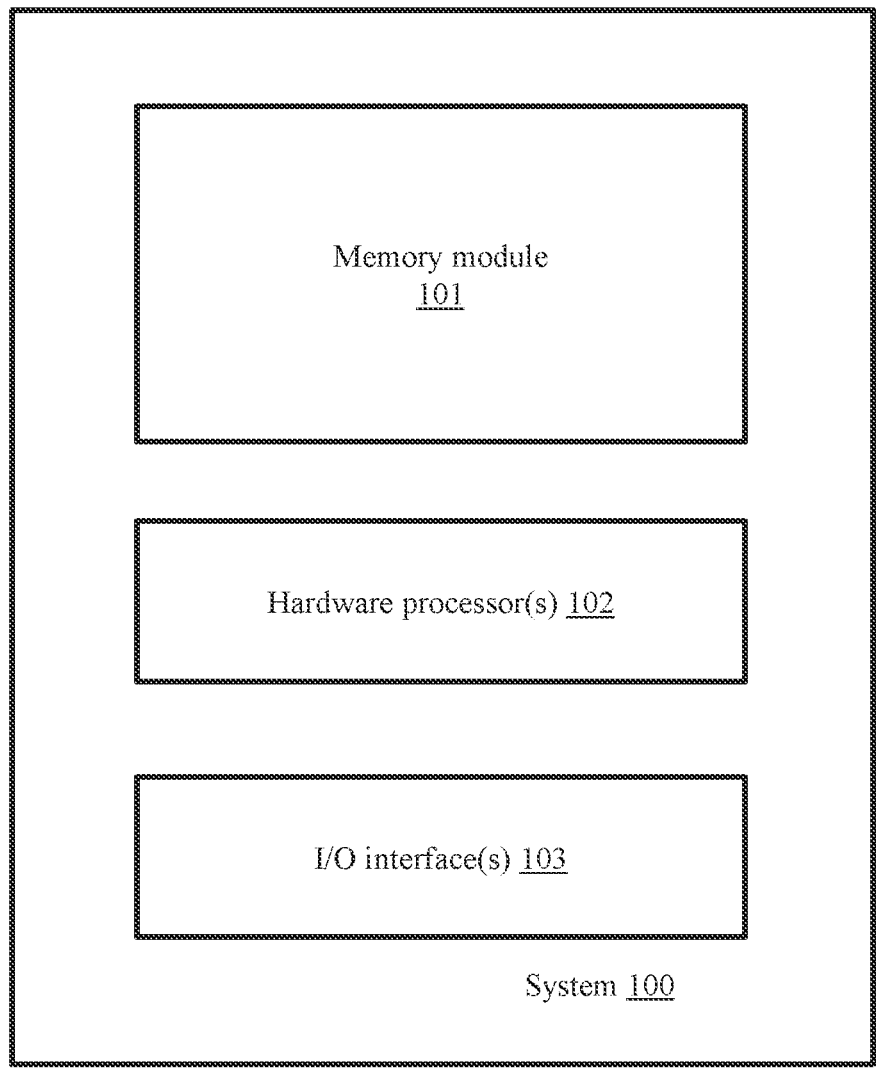
FIG. 1 illustrates an exemplary system for sustainability measurement, according to some embodiments of the present disclosure.
Figure 2A:
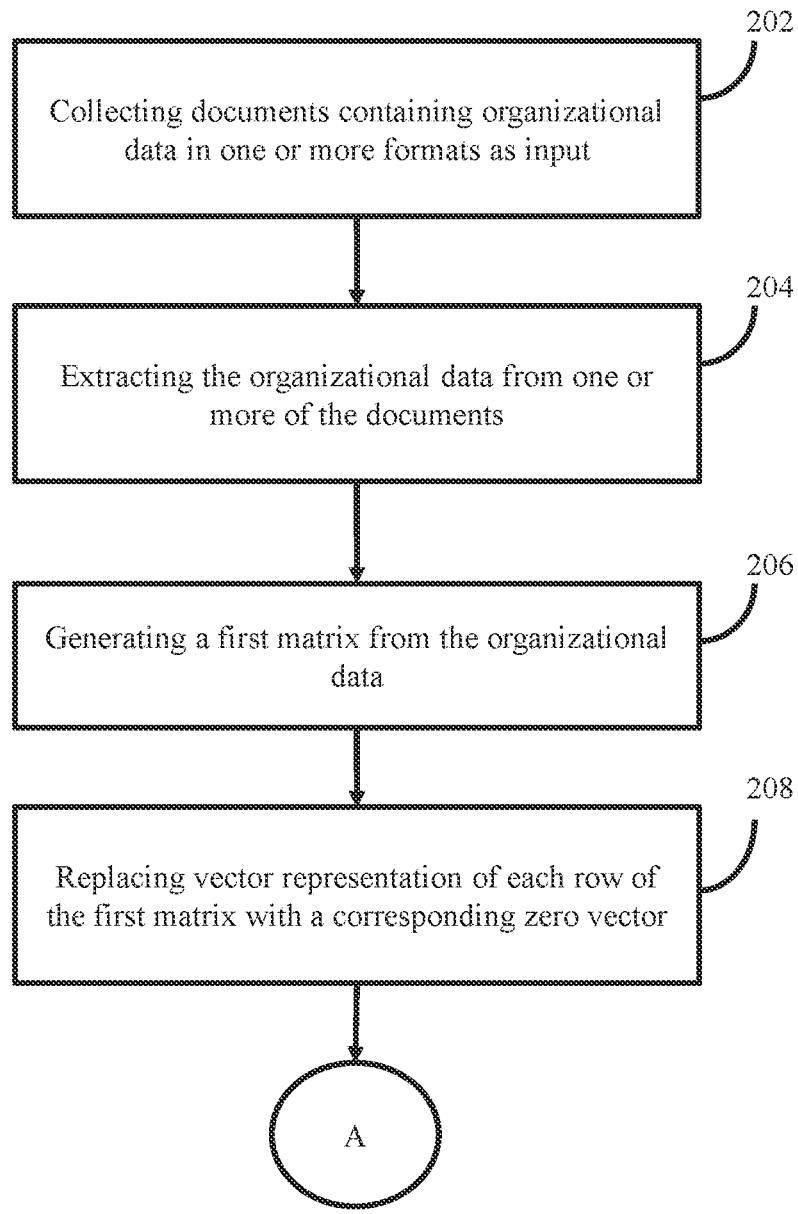
FIGS. 2A and 2B (collectively referred to as FIG. 2) is a flow diagram depicting steps involved in the process of performing the sustainability measurement by the system of FIG. 1, according to some embodiments of the present disclosure.
Figure 2B:
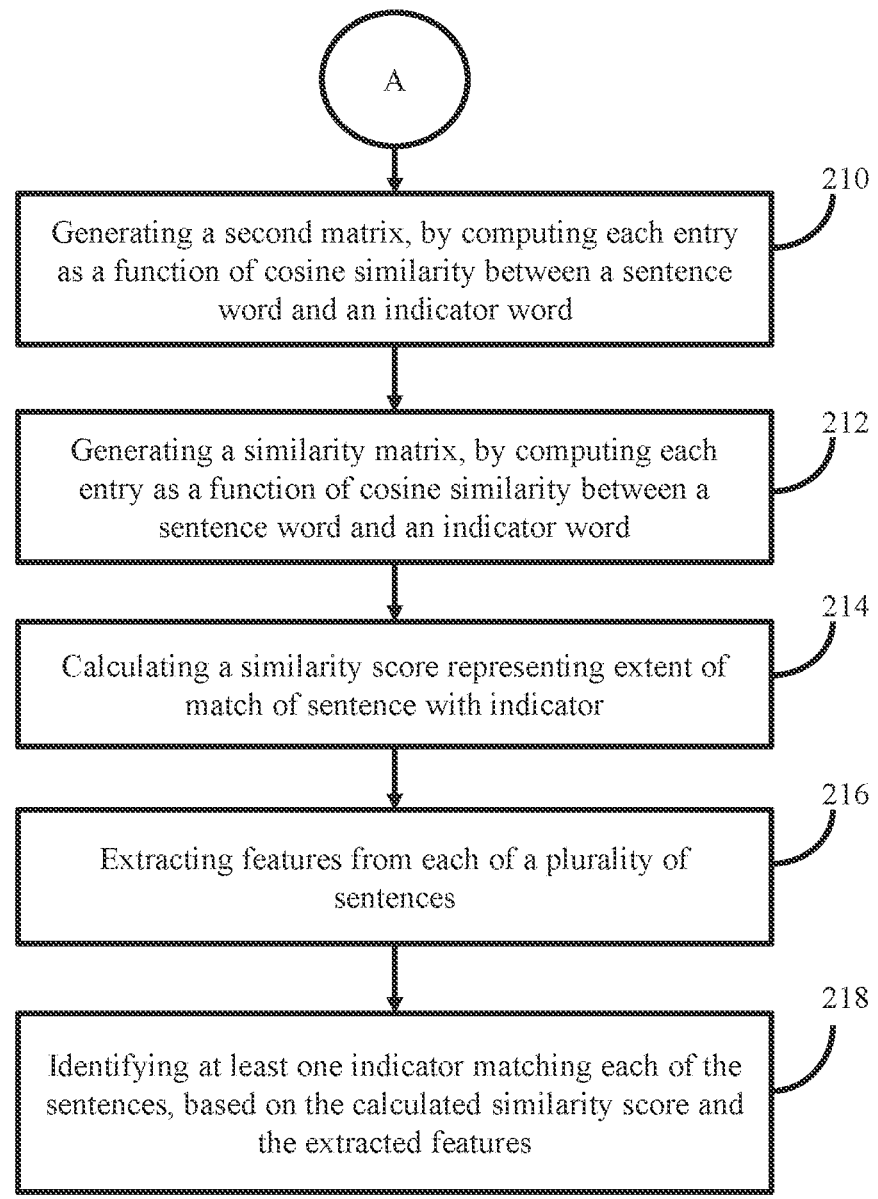
Figure 3:
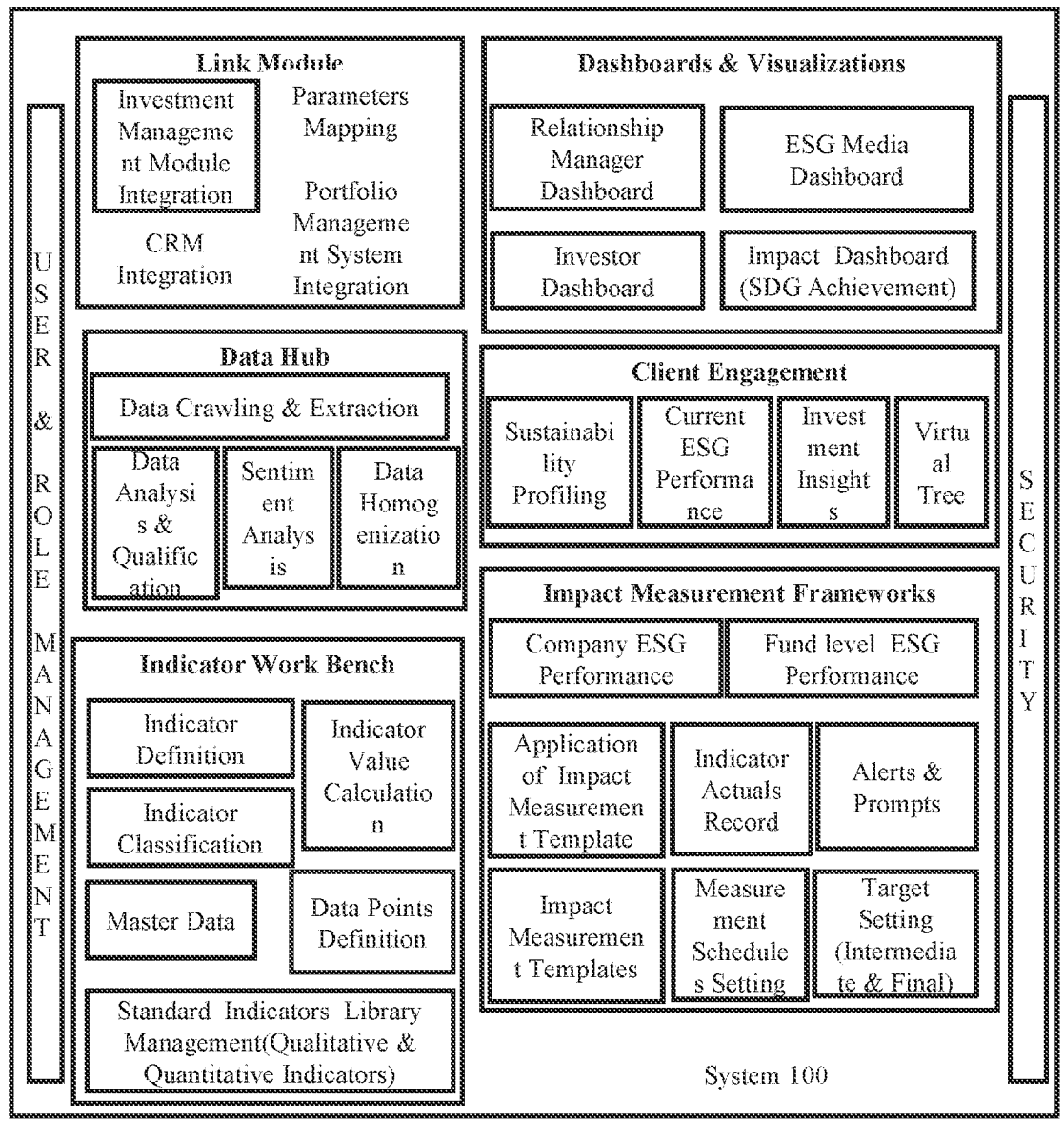
FIG. 3 is an example illustration of the system of FIG. 1 as a sustainability monitoring framework, in accordance with some embodiments of the present disclosure.

Referring now to the drawings, and more particularly to FIG. 1 through FIG. 3, where similar reference characters denote corresponding features consistently throughout the figures, there are shown preferred embodiments and these embodiments are described in the context of the following exemplary system and/or method.

FIG. 1 illustrates an exemplary system for sustainability measurement, according to some embodiments of the present disclosure. The system 100 includes a memory module 101, one or more The memory module(s) 101 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 101. The memory module (s) 101 are further configured to store a plurality of instructions, which when executed, cause the one or more hardware processor(s) 102 to perform different actions associated with the sustainability measurement being handled by the system 100. The memory module(s) 101 can be further configured to store any data (such as input sensor data, any intermediate output (such as input data collected any session, the sustainability measured each set of inputs, and so on), and output, associated with the sustainability measurement being handled by the system 100.

The one or more hardware processors 102 can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like. The one or more hardware processors 102 are configured to perform data and control signal processing, at different stages of the sustainability measurement, as required.

The communication interface(s) 103 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the communication interface(s) 103 can include one or more ports for connecting a number of devices to one another or to another server. The communication interface(s) can be configured to provide one or more channels with appropriate protocols, for the system 100 to communicate with one or more external systems. For example, the communication interface(s) 103 interacts and collects inputs required for the sustainability measurement, from one or more sensors, wherein the sensors may or may not be part of the system 100. The communication interface(s) 103 may further provide appropriate user interface(s) for an authorized user to interact with the system 100. The communication interface(s) 103 can be further configured to provide one or more channels for different components of the system 100 to interact with each other and perform data and/or control transfer.

The system 100 may be implemented in a variety of ways, as per requirements. Data processing requirements associated with the sustainability measurement being handled by the system 100 are distributed among the components including the link module, data hub, indicator work bench, dashboards & visualization, client engagement, and impact measurement frameworks as depicted in FIG. 3. The link module is configured to integrate industry environments. The Data hub which acquires data from multiple data sources pre-defined and qualified either in whole or in granularity. The indicator workbench here possesses array of indicators algorithmically defined with data points. The fetched data is used to calculate the indicator values. The dashboards and visualizations help in presentation of indicator values aggregated across board. These dashboards can be specific to various stakeholders. This hierarchy is also pre-set, and may be dynamically re-configured as per requirements. The impact measurement frameworks are pre-defined performance templates with chosen indicators. The frameworks can be applied across different industries, sectors etc. The system 100 may also be configured to measure achievements against targets, so that there is continuous improvement. Client preferences and profiling can be done with respect to Environmental, Social, and Corporate Governance (ESG) expectations in investment environments and clients matching the expectation in terms of ESG performance can be mapped.

FIG. 2 is a flow diagram depicting steps involved in the process of performing the sustainability measurement by the system of FIG. 1, according to some embodiments of the present disclosure. At step 202, the system 100 collects a plurality of documents containing organizational data and/or any additional data that may be required for the sustainability measurement. Based on parameters such as but not limited to level and quality of source from which the data is collected, the system 100 may calculate/compute a data quality score which indicates quality of data being fed as input to the system 100. The 'levels' and 'quality' of sources may be determined and pre-configured with the system 100. For example, the data level may be at least one of a) company level data, b) parent/group level data, c) peer group level data, d) sector level data, and e) no data f) Geography level data (Viz., Country, Region etc.,). Similarly, each data sources may be classified into one of High, Low, and Medium classes, based on pre-defined quality standards. For example, sources such as but not limited to subscribed sources, data partners, published reports, and websites of Pre-determined types and so on are classified as having 'High' quality, and a source score of 3. Similarly, sources such as but not limited to association websites, and news websites are classified as having 'Medium' quality, and a source score of 2, Further, sources such as but not limited to social media and other such sources are classified as having 'Low' quality, and a source score of 1 is assigned. In similar manner, different data levels (alternately referred to as levels) also are defined and pre-configured with the system 100, along with a level score. For example, company level data are assigned a level score of 4, group level data are assigned a level score of 3, peer group level data are assigned a level score of 2, sector level data are assigned a level score of 1, and no data is assigned a level score of 0. The system 100 may then calculate the data quality score as:

$$\text{Data quality score} = \text{data source score} * \text{level score} \quad (1)$$

After determining the data quality score for all data being collected as input, the system 100 may consider having data quality exceeding a set minimum threshold of quality, for further processing. At this stage, the system 100 sets appropriation logic for Indicators at targeted/desired levels, based on feasibility of data available. For example, if the targeted level is either project or transaction and the indicator data feasibility is at Company or sectoral levels, standard norms and parameters are pre-defined and algorithms set to appropriate the indicator value to the desired level. It may be noted that the indicator value may be acquired in full or in granularity.

The system 100 may be configured to separately process each of the plurality of documents using one or more appropriate technique, at step 204 for extracting the organizational data from the extracted documents. For example, the system 100 may use NLTK sentence tokenizer from an NLTK natural language toolkit to split contents of each document into a plurality of constituting sentences. For a document d with a set of n sentences, denoted by S and a set of indicators I with cardinality m (where m denotes the number of unique indicators), the system 100 finds a subset of most relevant sentences $s \subset S$ corresponding to each indicator $c \in I$. It may be noted that information about an indicator may be present in terms of related concepts in arbitrarily complex ways inside a document written in natural language.

From the document being processed, consider a sentence having 'x' number of words and an indicator having 'y' number of words. The system 100 generates (206) a first matrix 'A' of suitable dimensions, where each row of A is a vector representation for each word of a sentence obtained using a suitable technique, for example, a 100-dimensional Glove embedding technique. In order to reduce the effect of stop-words in each sentence, the system 100 replaces (208) each raw of A with corresponding vector representation.

The system 100 then generates (210) a second matrix 'B' of suitable dimensions (for example, B may be a (y+1)×100 matrix) where $1^{st}$ to $y^{th}$ rows of B correspond to the embeddings of words in an indicator and the $(y+1)^{th}$ row is obtained by taking a tuple-wise average of the constituent word embeddings. Further, the system 100 generates (212) a (y+1)×(x) Similarity matrix 'C' where each entry $c_{ij}$ in C is computed as a function of cosine similarity between a sentence word $x_i$ and an indicator word $y_j$.

The system 100 then calculates (214) a similarity score between the indicator and a sentence is calculated as:

$$\text{Score} = ((\max C)^T * (W)) I(y+1) \text{ where } D^T \text{ denotes transpose of a matrix } D \quad (2)$$

Where maxC is a column matrix of size (y+1) obtained by applying Max function on each row of a matrix C and W is also a column matrix of size (y+1) obtained by computing significance of indicator words in a page by using their term frequencies and distribution across pages. The similarity score for each sentence-indicator pair indicates/represents extent of similarity between the sentence and the indicator. Based on the similarity score calculated for each sentence-indicator pairs, a n×m in matrix is generated where each entry denotes the similarity score between the sentence s and the indicator c calculated by using equation (2).

Further the system 100 extracts (216) features/feature vectors from each of the plurality of sentences. A sentence matrix M of order n×f contains the features for every sentence of a matrix. Here 'f' denotes the number of features. A few examples of features that are extracted by the system 100 are, but not limited to, a) Similarity score vector, b) Numerical Presence, c) Date feature, d) Units of measurement, and e) Sentence length. Definition of each of the features is given below:

Numerical Presence—A sentence in the document is said to be important for an indicator if there is a presence of quantifiable information in the sentence which can be identified and counted using Named Entity Recognition. The system 100 is configured to utilize numeric named entities such as but not limited to money, percentage, cardinal, date, quantity and ordinal numbers. The system 100 may use any appropriate technique (for example, SpaCy's Named Entity Recognizer (NER)) to locate and identify numeric named entities from each sentence. The system 100 may be further configured to use One-hot encoded vector of numerical classes as a feature.

Date Feature—Presence of date named entity in the sentence can also determine the relevance of the sentence. The system 100 is configured to assess importance of each of the sentences based on type of information in the sentence. For example, the sentences which contain futuristic information as well as past information may be classified by the system 100 as sentences having least significance, and the sentences having mentions of current time instance may be considered by the system 100 as sentences having high significance. Based on the determined significance of each of the sentences, the system 100 assigns a date feature sore (P) for each sentence. by considering the following conditions:

P=2, If the sentence contains current year information
P=1, If the sentence contains past year information
P=0, If the sentence contains future year information
Unit of measurements—Let L be the list of units of measurements used for the indicators. Presence of unit of measurements is one of the factors deciding the relevancy of the sentence, as presence of the unit of measurements in a sentence indicates presence of numerical information in the sentence. The system 100 creates one hot encoding for each sentence where '1' denotes the presence of corresponding unit in a sentence.
Sentence Length—The system 100 determines the length of each sentence by counting the number of words in the sentence.

The system 100 then identifies (218) at least one indicator matching each of the sentences, based on the calculated similarity score and the extracted features. At this stage, the similarity score and the features indicate to the system 100 relevance of each sentence. The system 100 may use a feed forward neural network classifier to classify the sentences into one of the existing indicator categories, or as 'Others' if the sentence is not found to be relevant for any of the categories. The system 100 may use a mufti-layer perceptron with single hidden layer and softmax output layer as a classifier. The input layer takes as input the feature vector. The output layer uses the softmax function to classify the input sentence into one of the existing indicator categories or others if found not relevant. Each of the indicator categories has a specific sustainability measurement associated with it. As part of the sustainability measurement, the system 100 identifies an indicator category majority of the sentences are associated with. Further, based on the sustainability measurement associated with that particular indicator category, the sustainability measurement is performed at document level. Further, for the sustainability measurement at an organizational level, the aforementioned process is performed at the organizational level. At this stage, the system 100 determines an indicator category majority of the documents collected from the organization are associated with, and based on the sustainability measurement of the identified indicator category, sustainability of the organization is assessed/determined.

In various embodiments, steps in method 200 may be performed in the same order as depicted in FIG. 2 or in any alternate order which is technically feasible.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of sustainability measurement of organizations. The embodiment, thus provides a mechanism of assessing sustainability based on a determined association of sentences in each document with one or more indicator categories. Moreover, the embodiments herein further provides a mechanism of assessing sustainability of an organization based on sustainability measurement of a majority of documents collected from the organization.

it is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for sustainability measurement, comprising:
   collecting a plurality of documents in one or more formats from at least one data source as input, via one or more hardware processors, wherein the plurality of documents contain organizational data;
   extracting the organizational data using at least one data-crawling mechanism, via the one or more hardware processors; and
   processing the extracted organizational data, via the one or more hardware processors, comprising:
      generating a first matrix, wherein each row of a plurality of rows in the first matrix is a vector representation of each of a plurality of words in at least one sentence in the extracted organizational data;
      replacing the vector representation of each of the plurality of rows with a corresponding zero vector;
      generating a second matrix, wherein
         a plurality of rows of the second matrix correspond to embeddings of a plurality of words in at least one indicator, and
         at least one other row in the second matrix correspond to a tuple-wise average of the embeddings;
      generating a similarity matrix, wherein each entry in the similarity matrix is computed as a function of cosine similarity between a sentence word and an indicator word;
      calculating a similarity score based on data in the similarity matrix, wherein the similarity score calculated for each sentence and an indicator represents extent of match of the sentence with the indicator;
      extracting a plurality of features from each of a plurality of sentences of the organizational data;
      identifying at least one indicator matching each of the plurality of sentences, based on the calculated similarity score and the extracted plurality of features; and
      measuring sustainability of the organization based on a determined indicator category of majority of the plurality of documents collected from the organization, wherein the indicator category of the majority of the plurality of documents is determined based on the identified at least one indicator matching each of the plurality of sentences in each of the plurality of documents.

2. The method as claimed in claim 1, wherein the extracted plurality of features comprise numerical presence, data feature, units of measurement, and sentence length.

3. The method as claimed in claim 2, wherein each of a plurality of sustainability documents are classified based on the sustainability measurement, comprising:
   collecting feature vectors corresponding to the extracted plurality of features from each of the plurality of sustainability documents, as input;
   determining association of each sentence in each of the plurality of documents with a sustainability indicator; and
   classifying each of the plurality of documents, based on association of majority of sentences in each document with the corresponding sustainability indicator.

4. A system for sustainability measurement, comprising:
   one or more hardware processors;
   a communication interface; and
   a memory storing a plurality of instructions, wherein the plurality of instructions when executed, cause the one or more hardware processors to:
      collect a plurality of documents in one or more formats from at least one data source as input, wherein the plurality of documents contain organizational data; and
      extract the organizational data using at least one data-crawling mechanism;
      process the extracted organizational data, by:
         generating a first matrix, wherein each row of a plurality of rows in the first matrix is a vector representation of each of a plurality of words in at least one sentence in the extracted organizational data;
         replacing the vector representation of each of the plurality of rows with a corresponding zero vector;
         generating a second matrix, wherein
         a plurality of rows of the second matrix correspond to embeddings of a plurality of words in at least one indicator, and
         at least one other row in the second matrix correspond to a tuple-wise average of the embeddings;
         generating a similarity matrix, wherein each entry in the similarity matrix is computed as a function of cosine similarity between a sentence word and an indicator word;
         calculating a similarity score based on data in the similarity matrix, wherein the similarity score calculated for each sentence and an indicator represents extent of match of the sentence with the indicator;
         extracting a plurality of features from each of a plurality of sentences of the organizational data;
         identifying at least one indicator matching each of the plurality of sentences, based on the calculated similarity score and the extracted plurality of features; and
         measuring sustainability of the organization based on a determined indicator category of majority of the plurality of documents collected from the organization, wherein the indicator category of the majority of the plurality of documents is determined based on the identified at least one indicator matching each of the plurality of sentences in each of the plurality of documents.

5. The system as claimed in claim 4, wherein the system extracts numerical presence, data feature, units of measurement, and sentence length, as the plurality of features.

6. The system as claimed in claim 5, wherein the system classifies each of a plurality of sustainability documents based on the sustainability measurement, by:
   collecting feature vectors corresponding to the extracted plurality of features from each of the plurality of sustainability documents, as input;

determining association of each sentence in each of the plurality of documents with a sustainability indicator; and classifying each of the plurality of documents, based on association of majority of sentences in each document with the corresponding sustainability indicator.

7. A non-transitory computer readable medium for sustainability measurement, wherein the non-transitory computer readable medium comprising a plurality of instructions, which when executed, cause:

collecting a plurality of documents in one or more formats from at least one data source as input, via one or more hardware processors, wherein the plurality of documents contain organizational data;

extracting the organizational data using at least one data-crawling mechanism, via the one or more hardware processors; and processing the extracted organizational data, via the one or more hardware processors, comprising:

generating a first matrix, wherein each row of a plurality of rows in the first matrix is a vector representation of each of a plurality of words in at least one sentence in the extracted organizational data;

replacing the vector representation of each of the plurality of rows with a corresponding zero vector, generating a second matrix, wherein
 a plurality of rows of the second matrix correspond to embeddings of a plurality of words in at least one indicator, and
 at least one other row in the second matrix correspond to a tuple-wise average of the embeddings;

generating a similarity matrix, wherein each entry in the similarity matrix is computed as a function of cosine similarity between a sentence word and an indicator word;

calculating a similarity score based on data in the similarity matrix, wherein the similarity score calculated for each sentence and an indicator represents extent of match of the sentence with the indicator;

extracting a plurality of features from each of a plurality of sentences of the organizational data;

identifying at least one indicator matching each of the plurality of sentences, based on the calculated similarity score and the extracted plurality of features; and measuring sustainability of the organization based on a determined indicator category of majority of the plurality of documents collected from the organization, wherein the indicator category of the majority of the plurality of documents is determined based on the identified at least one indicator matching each of the plurality of sentences in each of the plurality of documents.

8. The non-transitory computer readable medium as claimed in claim 7, wherein the extracted plurality of features comprise numerical presence, data feature, units of measurement, and sentence length.

9. The non-transitory computer readable medium as claimed in claim 8, wherein each of a plurality of sustainability documents are classified based on the sustainability measurement, comprising:

collecting feature vectors corresponding to the extracted plurality of features from each of the plurality of sustainability documents, as input;

determining association of each sentence in each of the plurality of documents with a sustainability indicator; and classifying each of the plurality of documents, based on association of majority of sentences in each document with the corresponding sustainability indicator.

* * * * *